(12) United States Patent
Wu et al.

(10) Patent No.: US 12,539,947 B2
(45) Date of Patent: Feb. 3, 2026

(54) INSTALLATION SYSTEM AND METHOD FOR AN OFFSHORE WIND TURBINE

(71) Applicant: Deep Reach Technology, Inc., Stafford, TX (US)

(72) Inventors: Shukai Wu, Katy, TX (US); John Halkyard, Houston, TX (US)

(73) Assignee: Deep Reach Technology, Inc., Stafford, TX (US)

( * ) Notice: Subject to any disclaimer, the term of this patent is extended or adjusted under 35 U.S.C. 154(b) by 54 days.

(21) Appl. No.: 18/681,059

(22) PCT Filed: Aug. 4, 2022

(86) PCT No.: PCT/US2022/074536
§ 371 (c)(1),
(2) Date: Feb. 4, 2024

(87) PCT Pub. No.: WO2023/015254
PCT Pub. Date: Feb. 9, 2023

(65) Prior Publication Data
US 2024/0270356 A1    Aug. 15, 2024

Related U.S. Application Data

(60) Provisional application No. 63/229,458, filed on Aug. 4, 2021.

(51) Int. Cl.
*B63B 77/10* (2020.01)
*F03D 13/10* (2016.01)
*F03D 13/25* (2016.01)

(52) U.S. Cl.
CPC ............ *B63B 77/10* (2020.01); *F03D 13/126* (2023.08); *F03D 13/256* (2023.08); *F05B 2230/60* (2013.01); *F05B 2240/93* (2013.01); *F05B 2240/95* (2013.01)

(58) Field of Classification Search
CPC ....... B63B 77/10; B63B 35/003; F03D 13/10; F03D 13/25; F03D 13/126; F03D 13/256; F05B 2230/60; F05B 2240/93; F05B 2240/95
See application file for complete search history.

(56) References Cited

U.S. PATENT DOCUMENTS

2014/0103664 A1    4/2014  Abiassi

FOREIGN PATENT DOCUMENTS

| CN | 103807115 B | 5/2018 |
|----|----|----|
| DE | 102014014990 A1 | 4/2016 |
| WO | 2021002759 A1 | 1/2021 |
| WO | 2021254786 A1 | 12/2021 |

*Primary Examiner* — Moshe Wilensky
(74) *Attorney, Agent, or Firm* — Saunders McKeon PLLC

(57) ABSTRACT

A method and system for horizontally mating an offshore wind turbine generator assembly, typically including a tower and wind turbine nacelle and blades, with a substructure platform to form an integrated substructure unit, wet towing the unit to installation site offshore, and then installing the unit independent of cranes and derricks.

12 Claims, 6 Drawing Sheets

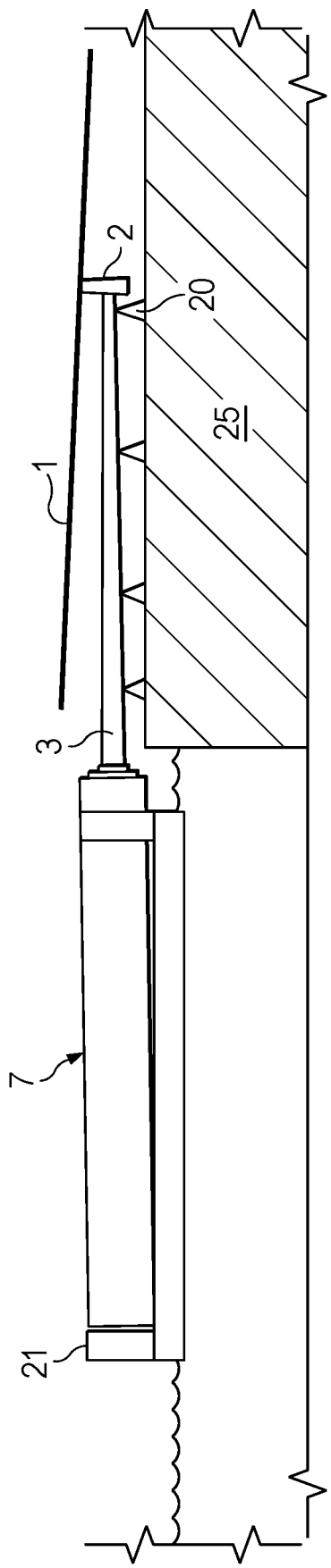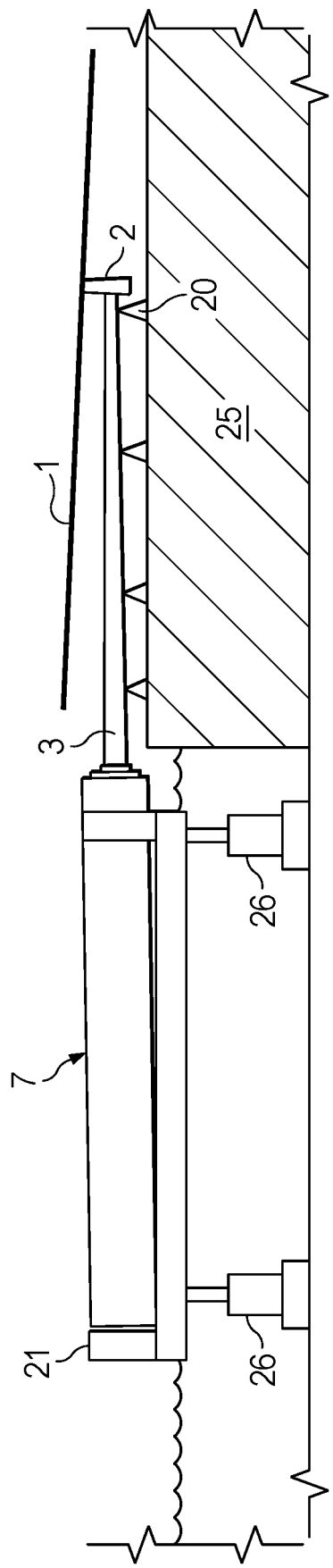
FIG. 4A
FIG. 4B

INSTALLATION SYSTEM AND METHOD FOR AN OFFSHORE WIND TURBINE

RELATED APPLICATIONS

This application claims the benefit of the U.S. Provisional Application No. 63/229,458, filed Aug. 4, 2021.

BACKGROUND OF THE INVENTION

Wind turbines installed offshore to date are mostly in shallow water using a steel or concrete monopile fixed to the seabed as the substructure. Installation of these wind turbines typically involves the use of a jackup installation vessel with a heavy construction crane. To begin the installation, the jackup vessel is parked beside the substructure where the fixed offshore wind turbine is to be installed with the vessel being jacked up and supported on its jackup legs. The wind turbine is then typically installed by lifting in sequence a transition piece onto the substructure to strengthen the tower connection, then the tower mated onto the transition piece, rotor-nacelle assembly (RNA—containing the generator) and finally turbine blades are connected to the rotor-nacelle assembly. Sometimes a complete pre-assembled tower with RNA and blades (a "wind turbine assembly") are lifted as a single piece onto the substructure transition piece.

Offshore wind turbine installations in deep water necessitate the use of larger wind turbines supported on a floating substructure for a project to be economically viable. The substructure may be one of several floating platforms such as a semi-submersible, tension-leg platform, or a spar type platform. Depending on the substructure and local facilities, the turbines may be installed offshore or inshore (in a port or protected waters). For offshore installation, the larger and heavier wind turbines and the deep-water depth call for the use of a semisubmersible construction vessel (SSCV) or equivalent with heavy crane capacity with very high day rates. Furthermore, the motions of the floating substructure and/or that of the SSCV relative to the substructure makes the lifting and integration of the wind turbine with the substructure offshore much more complex, time-consuming, and risky with greatly increased installation cost and risk.

For inshore turbine installation, the wind turbine is typically pre-assembled on land at quayside and then lifted vertically onto the floating substructure quayside or near shore to form a floating offshore wind turbine unit. The unit is then towed to the offshore operating site with the turbine in place and the substructure in moored in place. This method requires a near shore integration site that is sheltered and deep enough for the integration of the wind turbines with the substructure, and access needs to free of bridges or other overhead constraints that would limit the transit of the substructure with tower from the port. For floating substructures such as the spar platform which must be in deep water it is not possible to install a vertical wind turbine tower assembly inshore, so the installation requires an offshore installation as described above once the spar is upended. Further discussion of floating offshore wind turbine installation may be found in (Ramachandran, Desmond, Judge, & Serraris, 2021).

SUMMARY OF EXAMPLE EMBODIMENTS

This invention specifically addresses the installation of the tower/RNA and blades on a floating spar type substructure ("platform") horizontally, while the platform is inshore.

An example embodiment may include a method for installing a wind turbine on a floating spar type platform in a horizontal configuration comprising combining a tower coupled to a rotor nacelle assembly (RNA) and blades on a supporting substructure such as a barge, deploying the spar platform in a horizontal or nearly horizontal configuration, aligning the platform with a transition piece in line with the tower, attaching the platform with the transition piece, providing a lifting support point for the tower on the barge, wherein the lifting support point allows the spar to be ballasted and rotated for towing or upending. The spar platform may be outfitted with appendages to facilitate ballasting and alignment of the spar during this operation.

The lifting support point may be motion compensated to uncouple motions of the barge from the tower and spar. It may include providing a guide on the barge to allow rotation of the spar to separate the tower and rotor nacelle assembly combination from the barge. The guide may be integral with the lifting support point. It may include placing the tower and nacelle on a semi-submersible barge. The spar, tower, and rotor nacelle assembly may float separately from the semi-submersible barge by simultaneous flooding of the spar platform and the semi-submersible barge to maintain acceptable loads on the tower and spar platform.

An example embodiment may include attaching the spar platform with the transition piece include welding or may include using at least one mechanical connector.

An example embodiment may include a method for installing a wind turbine on a floating platform comprising combining the tower and a rotor nacelle assembly and blades in a horizontal orientation, setting the platform on a semi-submersible barge in the sea adjacent to the position of the tower and rotor nacelle assembly combination on the land, aligning a spar with a transition piece in line with the tower, attaching the spar with the transition piece; and placing ballast in the spar and the semi-submersible barge, wherein the tower and rotor nacelle combination can rotate and separate from supporting points. The function of the transition piece is to transfer the loads efficiently between the substructure and the tower without causing areas of high stress concentration.

The complete integration and installation method may involve designing and configuring a platform with proper ballasting for towing and installation, mating it with a wind turbine assembly inshore or near shore as described above, towing the floating substructure platform with the wind turbine assembly to an offshore installation site and then upending and installing the complete floating offshore wind turbine.

An example embodiment may include a method for installing a wind turbine on a floating platform comprising combining a tower coupled to a wind generator rotor nacelle assembly and turbine blades in a nearly horizontal configuration on a support structure, deploying the floating platform in a horizontal or nearly horizontal configuration, aligning the floating platform in line with the tower on the support structure, attaching the floating platform with the tower, and providing a support point for the tower on the support structure, wherein the support point allows the platform to be ballasted and rotated for towing or upending while the tower remains supported on the support structure.

A variation of the example embodiments may include attaching the platform with the tower using a transition piece between the tower and the platform. It may include attaching the platform with the tower piece using at least one mechanical connector. The support point may be motion compensated to uncouple motions of the barge from the tower and floating platform. It may include providing a guide on the support structure to allow rotation of the floating platform to separate the tower and rotor nacelle assembly combination from the barge. It may include placing the tower and nacelle on a semi-submersible barge. It may include submerging the semi-submersible barge while ballasting the spar, wherein the spar, tower, and rotor nacelle assembly float separately from the semi-submersible barge.

An example embodiment may include a method for installing a wind turbine on a floating platform comprising combining a tower coupled to a wind generator rotor nacelle assembly and turbine blades in a nearly horizontal configuration on supporting points on a support structure, setting the platform on a semi-submersible barge in a nearly horizontal position in the sea adjacent to the position of the tower and rotor nacelle assembly combination, aligning the platform in line with the tower, attaching the platform with the tower, and placing ballast in the platform and the semi-submersible barge, wherein the tower and rotor nacelle combination can rotate and separate from supporting points on the support structure.

A variation of the example embodiments may include the support structure being located on land adjacent to the sea. Attaching the platform with the tower may include a transition piece between the tower and the platform. Attaching the platform with the tower piece may include using at least one mechanical connector. A support point may be provided for the tower on the support structure, wherein the support point allows the platform to be ballasted and rotated for towing or upending while the tower remains supported on the support structure.

BRIEF DESCRIPTION OF THE DRAWINGS

For a thorough understanding of the present invention, reference is made to the following detailed description of the preferred embodiments, taken in conjunction with the accompanying drawings in which reference numbers designate like or similar elements throughout the several figures of the drawing. Briefly:

FIGS. 4A, 4B, 4C, and 4D show example embodiments of alternative methods of connecting the spar platform on a semisubmersible barge and the wind turbine assembly.

DETAILED DESCRIPTION OF EXAMPLES OF THE INVENTION

In the following description, certain terms have been used for brevity, clarity, and examples. No unnecessary limitations are to be implied therefrom and such terms are used for descriptive purposes only and are intended to be broadly construed. The different apparatus, systems and method steps described herein may be used alone or in combination with other apparatus, systems, and method steps. It is to be expected that various equivalents, alternatives, and modifications are possible within the scope of the appended claims.

Example embodiments are disclosed for a method and system for horizontally mating an wind turbine assembly, typically including a tower and rotor nacelle assembly and blades, with a floating substructure (platform) to form an integrated floating offshore wind turbine unit, wet towing the unit to installation site offshore, and then installing the unit independent of cranes and derricks. The disclosure relates to a system and method for offshore wind turbine mating and installation in general. More specifically, the disclosure relates to a system and method for mating and integrating a wind turbine assembly with its floating substructure in a horizontal configuration inshore, wet towing the integrated floating offshore wind turbine to an offshore site and installing the floating offshore wind turbine unit at an offshore location. The method is specifically applicable to spar type substructure as the spar is typically constructed in a horizontal orientation and rotated 90 degrees (upended) for operations. However, the method may be applied to other substructures that might be capable of horizontal installation followed by upending or rotation of the tower.

Figure 1:
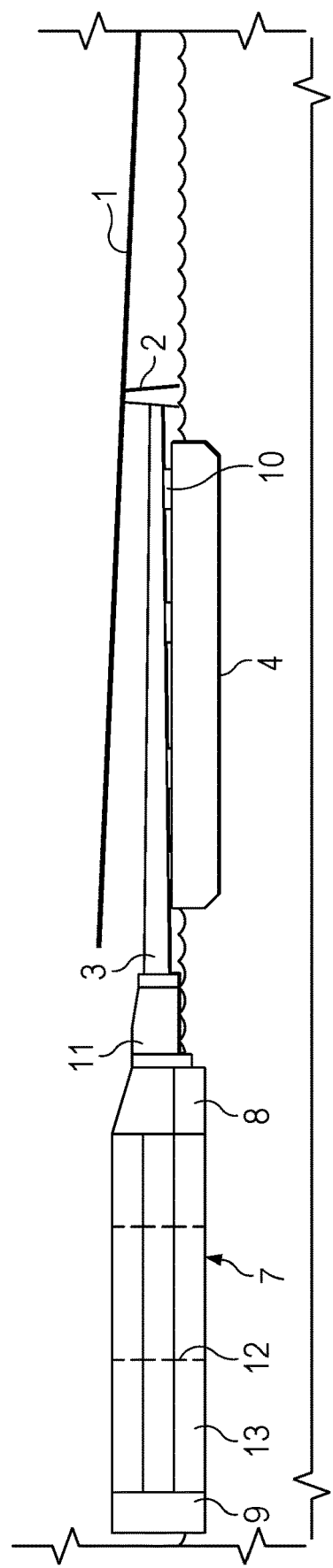
FIG. 1 shows an example embodiment with tanks affixed to the spar platform to allow adjustment of the draft and trim of the spar for mating with the wind turbine assembly.
Figure 2:
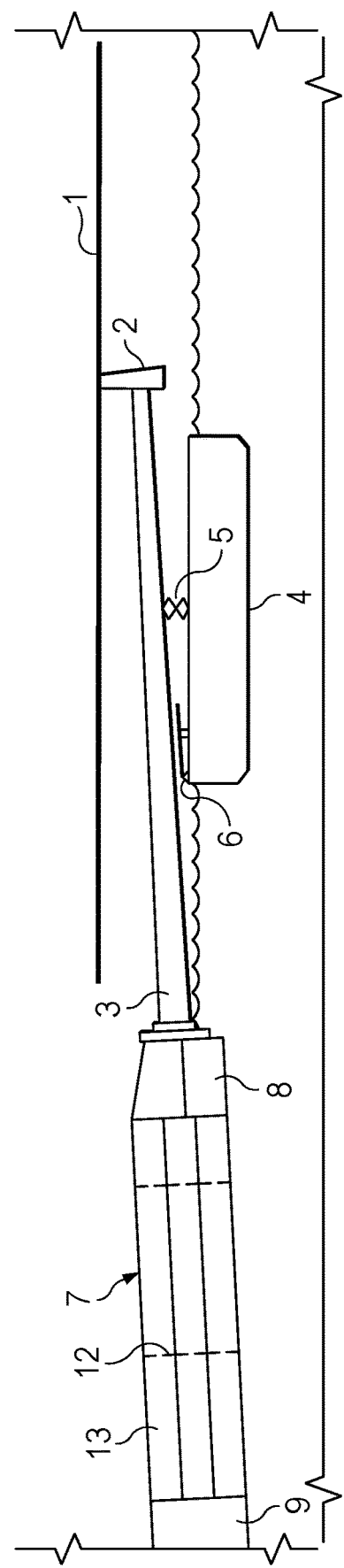
FIG. 2 shows an example embodiment with a motion compensated support between the barge and the wind turbine assembly.

An example embodiment is shown in FIGS. 1 and 2. The disclosure provides a method and system for mating and integrating a wind turbine assembly (or some other similar structure, such as metocean monitoring tower/mast, which is slender and elongated along one of its axis, and which stands vertically in its working condition) in a horizontally or nearly horizontally laid down position onto a separate substructure 4, and then installing the integrated floating offshore wind turbine unit offshore, independent of offshore cranes and derricks. FIG. 1 shows an example of a wind turbine assembly having blades 1, rotor nacelle assembly 2, tower 3 and transition piece 11 mounted on a barge 4 aligned for mating with a spar type platform 7. The transition piece 11 could alternately be mounted on the platform 7. The platform 7 can be constructed on land and then loaded out and launched into water.

The elevation and orientation of the wind turbine assembly is determined by the design of cribbing (support on the barge) 10 and the trim of the barge 4. The elevation and orientation of the spar platform 7, which is floating in the water, is determined by ballasting of compartments 9 and 13 separated by bulkheads 12 within the platform 7.

Mating of the structures may be performed by bringing the wind turbine assembly on the support substructure 4 together with the platform 7 so that structural connections can be closed to join the two structures together, FIG. 1. This might entail aligning pins to engage the structures while the two are bolted or grouted together.

Referring to FIG. 1, external tanks 8 or internal tanks 9 are affixed to the platform 7 to allow adjustment of the draft and trim of the platform 7 for mating with the wind turbine assembly. The tanks can be either temporary buoyancy modules or permanent tanks integral to the platform 7.

FIG. 2 shows schematically the integrated floating offshore wind turbine oriented for towing with motion compensated support 5 between the barge 4 and the tower 3.

The system for controlling the platform 7 and wind turbine assembly during towing and launching includes ballasting tanks 9 and 13 integrated into the platform 7, the support substructure 4 (e.g. a barge) with mating guides 6 with a temporary locking mechanism, and the tower support 5. Ballast tank 9 could contain a portion of fixed ballast required for the platform and wind turbine assembly to be stable when it is upended.

Figure 3:
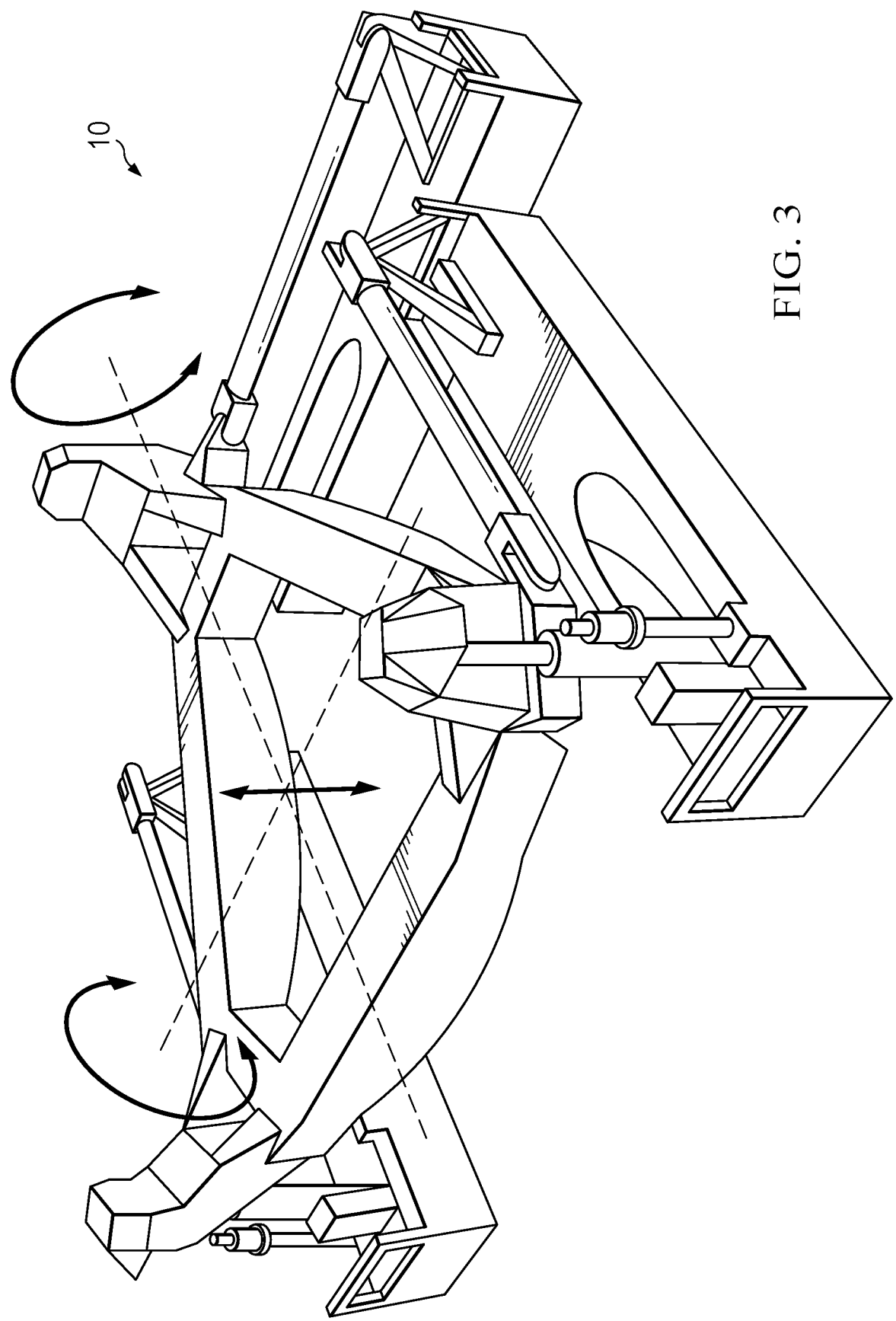
FIG. 3 shows an example embodiment of a motion compensated support.

FIG. 3 shows a motion compensated platform 10 that could be adapted for this purpose. This is based upon a commercially available platform. Alternately, the barge could be outfitted with bespoke supports to hold the wind turbine assembly that would prevent barge motions from affecting the mating operation.

An alternative method of connecting the platform and wind turbine assembly is illustrated in FIGS. 4A, 4B, 4C, 4D, and 5. In this method the platform is first loaded onto a semi-submersible barge 21 which can submerge deep enough for the platform 7 to float off. The wind turbine assembly is assembled on land and supported on cribbing and guide rails 20 to align with the platform 7 adjacent to a quay 25. The tower 3 is aligned with the platform 7 by maneuvering and ballasting the semi-submersible barge 21, together with positioning of the wind turbine assembly on the guides 20. Subsea jacks 26 may optionally be used to provide further stability to the semi-submersible barge 21 to facilitate connection between the platform 7 on the semi-submersible barge 21 and the tower 3. The joining of the tower 3 with the platform 7 may be by mechanical connections or welding.

Figure 4C:
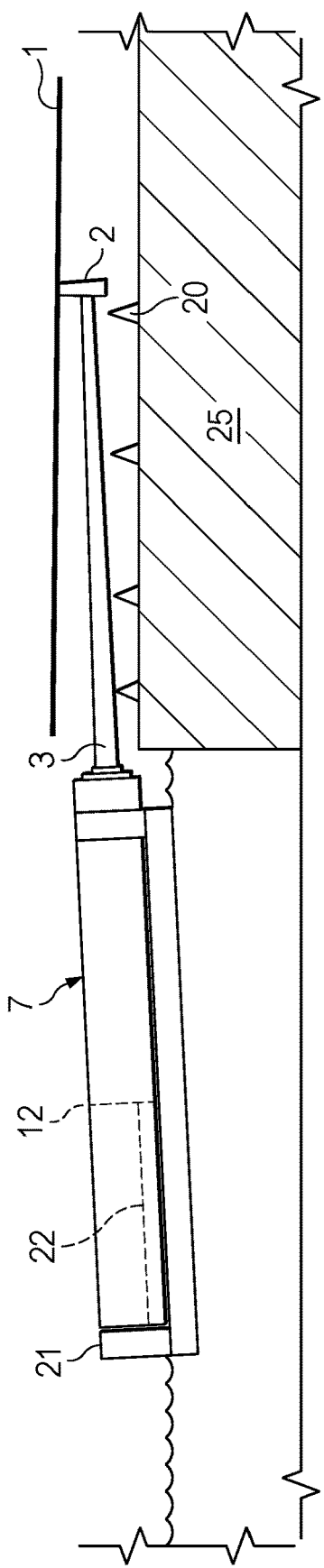
Figure 4D:
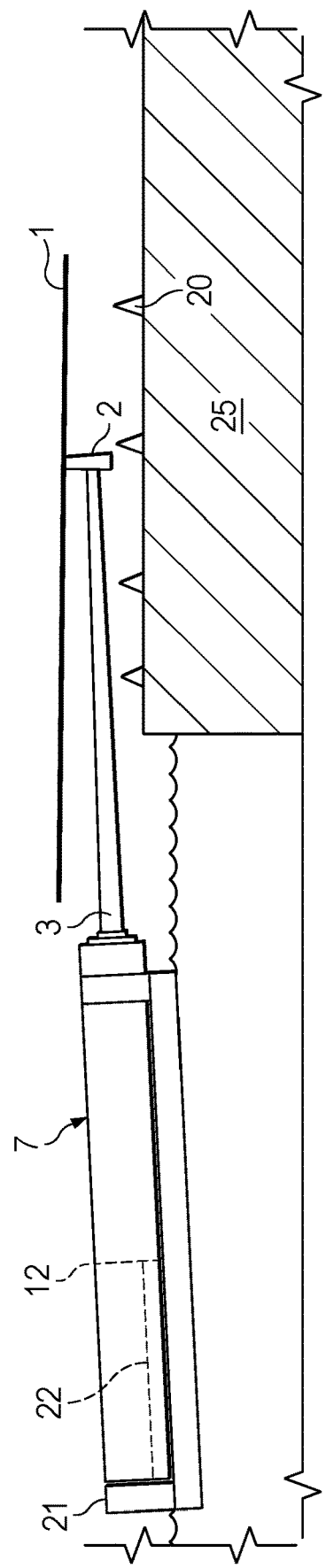

When the platform 7 and wind turbine assembly are joined, the wind turbine assembly may be lifted from the supporting guide rails by ballasting the semi-submersible barge 21, or by adding ballast 22 to the platform. In this illustration, the ballast 22 represents a portion of the fixed ballast required to stabilize the floating offshore wind turbine during operations. The fixed ballast is typically a heavy iron ore mixture. The ballast is shown occupying a compartment on the lower side of the platform 7. This facilitates a stable configuration for towing of the floating offshore wind turbine in a nearly horizontal orientation after separating from the semi-submersible barge 21. The wind turbine assembly is thus lifted from the guides, as shown in FIG. 4C, and the barge may be towed to an inshore or offshore site for float off.

Figure 5:
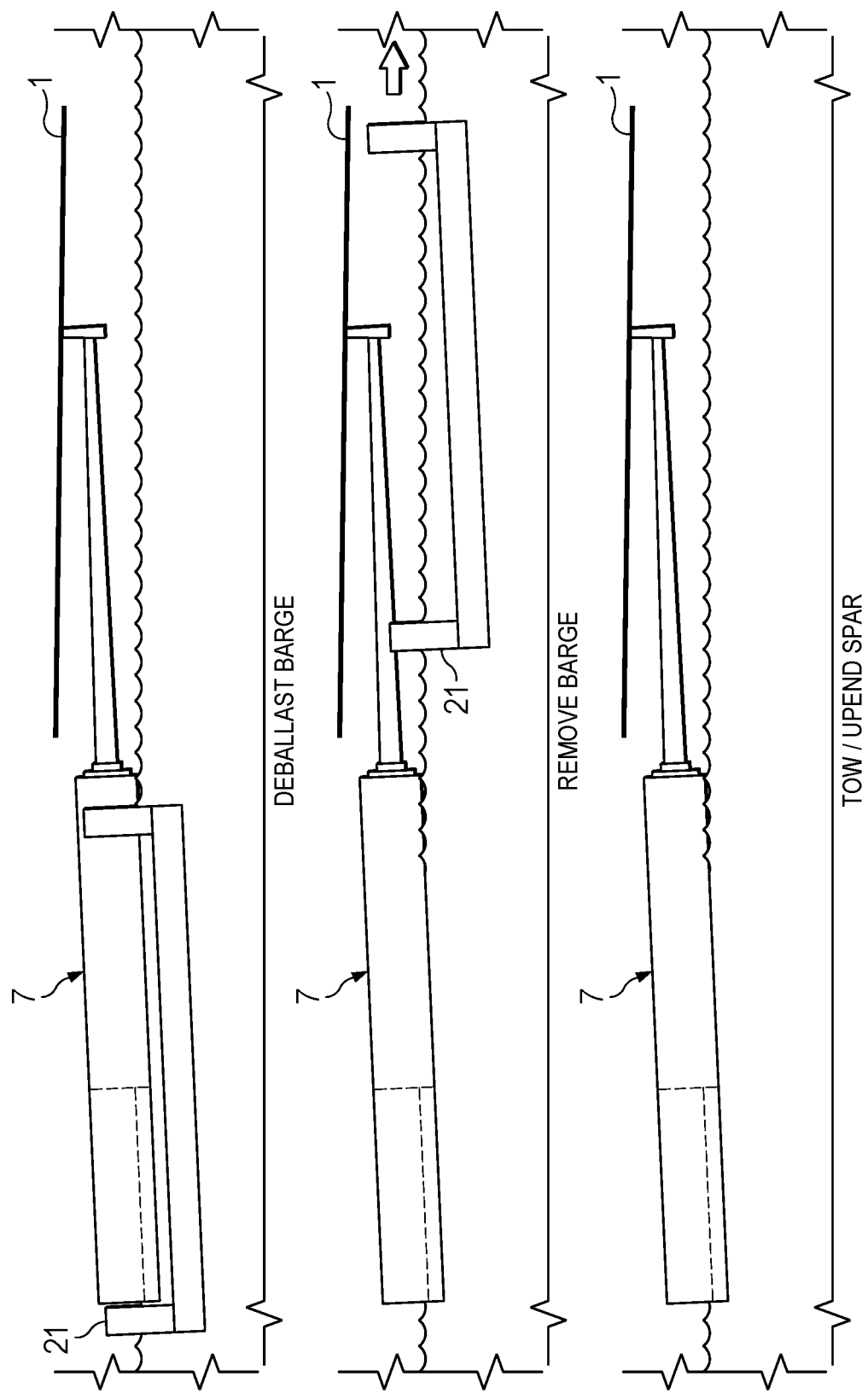
FIG. 5 shows an example embodiment of a method for floating the spar and attached wind turbine assembly by ballasting of the semisubmersible barge and spar.

FIG. 5 illustrates the floatoff operation that may take place inshore, if the water depth is sufficient, or offshore. The semi-submersible barge 21 is ballasted to the proper draft and trim to allow the floating offshore wind turbine to float independently, then the barge is removed.

In one example embodiment, the stable configuration has a draft at the keel of the spar of eight meters and a trim angle of 1.51 degrees.

Although the invention has been described in terms of embodiments which are set forth in detail, it should be understood that this is by illustration only and that the invention is not necessarily limited thereto. The alternative embodiments and operating techniques will become apparent to those of ordinary skill in the art in view of the present disclosure. Accordingly, modifications of the invention are contemplated which may be made without departing from the spirit of the claimed invention.

What is claimed is:

1. A method for installing a wind turbine on a floating platform comprising:
    combining a tower coupled to a wind generator rotor nacelle assembly and turbine blades in a horizontal configuration on a support structure;
    deploying the floating platform in a horizontal or horizontal configuration;
    aligning the floating platform in line with the tower on the support structure;
    attaching the floating platform with the tower;
    placing the tower and the nacelle assembly on a barge; and
    providing a support point for the tower on the support structure, wherein the support point allows the platform to be ballasted and rotated for towing or upending while the tower remains supported on the support structure, wherein the support point is motion compensated to uncouple motions of the barge from the tower and floating platform.

2. The method for installing a wind turbine on a floating platform of claim 1, wherein the attaching the platform with the tower includes a transition piece between the tower and the platform.

3. The method for installing a wind turbine on a floating platform of claim 2, wherein the attaching the platform with the transition piece includes using at least one mechanical connector.

4. The method for installing a wind turbine on a floating platform of claim 1, further comprising providing a guide on the support structure to allow rotation of the floating platform to separate the tower and rotor nacelle assembly combination from the barge.

5. The method for installing a wind turbine on a floating platform of claim 1, further comprising submerging the barge while ballasting the spar, wherein a spar, tower, and rotor nacelle assembly float separately from the barge.

6. A method for installing a wind turbine on a floating platform comprising:
    combining a tower coupled to a wind generator rotor nacelle assembly and turbine blades in a horizontal configuration on supporting points on a support structure;
    setting the platform on a barge in a horizontal position in the sea adjacent to the position of the tower and rotor nacelle assembly combination;
    aligning the platform in line with the tower;
    attaching the platform with the tower; and
    placing ballast in the platform and barge, wherein the tower and rotor nacelle combination can rotate and separate from supporting points on the support structure.

7. The method for installing a wind turbine on a floating platform of claim 6, wherein the support structure is on land adjacent to the sea.

8. The method for installing a wind turbine on a floating platform of claim 6, wherein the attaching the platform with the tower includes a transition piece between the tower and the platform.

9. The method for installing a wind turbine on a floating platform of claim 6, wherein the attaching the platform with the tower piece includes using at least one mechanical connector.

10. The method for installing a wind turbine on a floating platform of claim 6, wherein a support point is provided for the tower on the support structure, wherein the support point allows the platform to be ballasted and rotated for towing or upending while the tower remains supported on the support structure.

11. A method for installing a wind turbine on a floating platform comprising:
    combining a tower coupled to a wind generator rotor nacelle assembly and turbine blades in a horizontal configuration on a support structure;
    deploying the floating platform in a horizontal or horizontal configuration;
    aligning the floating platform in line with the tower on the support structure;
    attaching the floating platform with the tower;
    providing a support point for the tower on the support structure, wherein the support point allows the platform to be ballasted and rotated for towing or upending while the tower remains supported on the support structure; and providing a guide on the support structure to allow rotation of the floating platform to separate the tower and rotor nacelle assembly combination from a barge.

12. A method for installing a wind turbine on a floating platform comprising:

combining a tower coupled to a wind generator rotor nacelle assembly and turbine blades in a horizontal configuration on a support structure;

deploying the floating platform in a horizontal or horizontal configuration;

aligning the floating platform in line with the tower on the support structure;

attaching the floating platform with the tower;

providing a support point for the tower on the support structure, wherein the support point allows the platform to be ballasted and rotated for towing or upending while the tower remains supported on the support structure;

placing the tower and nacelle on a barge; and submerging the barge while ballasting the spar, wherein a spar, tower, and rotor nacelle assembly float separately from the barge.

* * * * *